US006810163B2

(12) United States Patent
Saito

(10) Patent No.: US 6,810,163 B2
(45) Date of Patent: Oct. 26, 2004

(54) OPTICAL SWITCH AND OPTICAL WAVEGUIDE APPARATUS

(75) Inventor: Takeshi Saito, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 205 days.

(21) Appl. No.: 10/093,798

(22) Filed: Mar. 11, 2002

(65) Prior Publication Data
US 2002/0168133 A1 Nov. 14, 2002

(30) Foreign Application Priority Data
May 9, 2001 (JP) ........................................ 2001-138803

(51) Int. Cl.[7] ................................................. G02B 6/35
(52) U.S. Cl. ............................................. 385/16; 385/17
(58) Field of Search ..................................... 385/16–23

(56) References Cited

U.S. PATENT DOCUMENTS 6,516,111 B1 * 2/2003 Jurbergs et al. ............... 385/18
6,519,381 B2 * 2/2003 Hatta et al. .................... 385/16
6,625,356 B2 * 9/2003 Ticknor et al. ................ 385/39

FOREIGN PATENT DOCUMENTS

| JP | 57-163205 | 10/1982 | |
| JP | 57163205 A | * 10/1982 | ........... G02B/5/174 |
| JP | 60-222816 | 11/1985 | |
| JP | 2000010030 A | * 1/2000 | ........... G02B/26/08 |

OTHER PUBLICATIONS

R. Pelrine, et al "Recent Progress in Artificial Muscle Micro Actuators" Fifth International Micromachine Symposium Tokyo, Japan, Oct. 1999.
R. Pelrine, et al "High–Speed Electrically Actuated Elastomers With Strain Greater Than 100%" Science vol. 287, Feb. 4, 2000, pp. 836–839.
U.S. patent application No. 09/,836,179, Tatsuo Hatta, et al, "Optical Switch and Method of Producing the Same" Filed Apr. 18, 2001.

* cited by examiner

Primary Examiner—Akm Enayet Ullah
Assistant Examiner—Michelle R. Connelly-Cushwa
(74) Attorney, Agent, or Firm—McDermott Will & Emery LLP

(57) ABSTRACT

Highly reliable optical switch and optical waveguide apparatus are obtained, which can perform stable and reliable ON/OFF operations for optical connection at a waveguide crossing portion. The optical switch is provided in an optical waveguide apparatus including a waveguide propagating light and a waveguide housing sheet enclosing the waveguide, and includes a slit portion slitting to traverse the waveguide; a driver performing driving action onto the slit portion; and a driver assistant member interposing the slit portion between the driver assistant member and the driver to assist the driver, the driver and driver assistant member pushing open the slit portion to provide a gap, and bring the slit portion into contact to connect waveguides.

17 Claims, 14 Drawing Sheets

"ON STATE"

"OFF STATE"

"VOLTAGE OFF"

"VOLTAGE ON"

"ON STATE"

"OFF STATE"

"ON STATE"

"OFF STATE"

"ON STATE"

"OFF STATE"

"ON STATE"

"OFF STATE"

"OFF STATE"

"ON STATE"

"OFF STATE"

"ON STATE"

"OFF STATE"

"ON STATE"

"ON STATE"

"OFF STATE"

OPTICAL SWITCH AND OPTICAL WAVEGUIDE APPARATUS

BACKGROUND OF THE INVENTION

1. Field of the Invention

The present invention relates to an optical switch and an optical waveguide apparatus used for switching of optical connection in an optical communication system.

2. Description of the Background Art

Referring to FIG. 26, an optical switch is provided for an optical waveguide 105 of a film polymer 102, i.e. a waveguide housing sheet 102, held between holding plates 103. Referring to FIG. 27, in an optical connection ON state (hereinafter simply referred to as ON state) in which a driving mechanism (push rod) 106 is not pushed at the crossing portion of the waveguide, waveguide housing sheet 102 keeps slit end surfaces 102a in contact with each other at a slit portion. Therefore, a core, i.e. waveguide 105, is also held in contact at the slit portion. Hence, the light arrived at the contact slit portion passed through the slit portion without its direction changed.

On the other hand, in an optical connection OFF state (hereinafter simply referred to as OFF state) in which push rod 106 is being pushed, push rod 106 pushes open slit end surfaces 102a from one side and separates them, as shown in FIG. 28, to expose the slit end surfaces to the air. Thus, the light propagated in the waveguide with a high refractive index cannot exit from one of the slit end surfaces, and changes the travelling direction approximately 90° by total reflection due to the air in an air gap 109, and then keeps being propagated.

According to the above system, in FIG. 26, when the optical connection at the crossing portion of the waveguide is in the ON state, light inputs L1, L2 continuously pass through the portion where slit end surfaces 102a of a waveguide crossing portion 111 are in contact with each other. On the other hand, when the optical connection at the waveguide crossing portion is in the OFF state, input lights L1, L2 both totally reflects at the portion of the optical switch and change the travelling directions approximately 90° to be output toward predetermined directions. As described above, the conventional optical switch is characterized in that the destination of light is switched by pushing/pulling one push rod 106.

Such an optical switch as described above has a problem when it switches from the OFF state to the ON state. That is, when the switch is switched from the OFF state, i.e. the state in which the push rod is pushed to totally reflect the light, to the ON state, i.e. the state where the light passes through, pulling back of the push rod only provides resilient force from the elasticity of the film polymer. This has caused a problem such that the contact between slit end surfaces 102a of film polymer 102 is insufficient, and sufficient contact of core 105 cannot be obtained.

SUMMARY OF THE INVENTION

It is an object of the present invention to provide an optical switch and an optical waveguide apparatus with excellent reliability and durability, which can perform stable and reliable ON/OFF operation of optical connection at a crossing portion of the waveguide.

According to the first aspect of the present invention, an optical switch is provided in an optical waveguide apparatus including waveguides through which light is propagated and a waveguide housing sheet enclosing the waveguides. The optical switch includes a slit portion slitting to traverse the waveguides; a driver (a driving mechanism) performing an driving action onto the slit portion; and a driver assistant member located to interpose the slit portion between the driver and the driver assistant member to assist the driver. The driver and the driver assistant member push open the slit portion and provide a gap between the waveguides, and brings the slit portion into contact to connect the waveguides.

By such an arrangement, deformation for restoring the connection, which conventionally had a problem in reliability, can be performed using a driver and a driver assistant member, for example, by loose constraint from both sides of the slit portion. This means that two members interposing the slit portion may be used to perform ON/OFF operation from both sides, instead of the conventional case where only one driver was used to perform ON/OFF operation from one side. This ensures connection of the slit portion to be restored and allows reliable switching from OFF state to ON state. Deformation to push open the slit portion by the driver has conventionally been reliable. Therefore, by enhancing the reliability of the restoring connection of the slit portion, the reliability of ON/OFF operation of optical connection can be enhanced. It is noted that the driver assistant member may be a member moving toward/from the slit portion in a reciprocating manner by a driving signal. However, even in such a case, the driver assistant member does not move in the same manner as that of the driver, but rather, moves to assist the driver. Furthermore, the waveguide housing sheet may be constituted by a film polymer or the like. Here, the term ON/OFF described above does not mean only whether the optical switch shuts off or passes the light which is input into the waveguide crossing portion. For example, the term ON/OFF may rather be used to define switching of the optical connection (output destination).

In the optical switch according to the first aspect of the present invention, the slit portion is preferably slit from one side of the waveguide housing sheet without the slit reaching the other side of the waveguide housing sheet.

By leaving a non-separated portion at the slit portion, the non-separated portion can be a reference at the time of restoring the connection of the slit portion, enhancing the reliability of restoration in restoring the end surfaces of the cores, i.e. the waveguides, to bring them again into contact with each other. Therefore, the reliability of the switching from OFF state to ON state can be enhanced.

In the optical switch according to the first aspect of the present invention, waveguides cross with one another inside of the waveguide housing sheet, and the slit portion may be arranged diagonally traversing the crossing portion when viewed two-dimensionally.

The arrangement ensures the light propagated in the waveguides to select its traveling direction, as to whether it continuously travels across the crossing portion in the same direction or it changes the direction and travels along a crossing waveguide.

In the optical switch according to the first aspect of the present invention, the driver moves forward to or backward from the slit portion in accordance with a driving signal, and the driver assistant member cooperates with the movement of the driver to act on the slit portion. The driver and the driver assistant member can push open the slit portion and can restore the slit portion to be back in contact.

This allows the use of a simple driving mechanism, and thus the optical switch and the optical waveguide apparatus can be provided at a low cost.

The optical switch according to the first aspect, at least one of the driver and the driver assistant member may include a member movable forward and backward along a direction approximately perpendicular to the waveguide housing sheet.

This allows ON/OFF operation by a short-distance movement, increasing the response speed of the optical switch.

In the optical switch according to the first aspect, the waveguide housing sheet is held by holding plates so as to support the waveguide housing sheet. Each of the holding plates preferably has an opening at a position corresponding to the slit portion.

This can ensure flatness of the waveguide housing sheet and can prevent a loss due to deformation of the waveguide. As a result, an optical waveguide apparatus with low-loss can be realized.

The optical switch according to the first aspect, at least one of the driver and the driver assistant member can be constituted by a piezoelectric element mechanically deformed in accordance with a voltage application.

A normal voltage application can induce high stress of hundreds of newtons, so that the piezoelectric element can be used for the optical switch of the present invention to perform reliable ON/OFF operation.

In the optical switch according to the first aspect, at least one of the driver and the driver assistant member may be constituted by an artificial muscle actuator.

The artificial muscle actuator has a deformation level of an animal muscle when a voltage is applied thereto. The artificial muscle may be made smaller to be on the order of tens of $\mu$m in size of the section perpendicular to the direction of deformation, and thus may be used for a waveguide apparatus that is extremely small in size.

In the optical switch using the artificial muscle actuator according to the first aspect of the present invention, the artificial muscle actuator includes an apertured frame having an aperture at a position corresponding to the slit portion when viewed two-dimensionally, and an elastic film with electrodes (hereinafter also referred to as an electrode-attached elastic film) arranged between the apertured frame and the waveguide housing sheet. One artificial actuator is provided at the upper side of the waveguide housing sheet and another artificial actuator is provided at the lower side of the waveguide housing sheet so as to interpose the sheet in between, and the artificial actuator on either side may include an apertured spacer film, having an aperture at the same region as the aperture of the apertured frame, between the actuator and the waveguide housing sheet.

By this arrangement, the electrode-attached elastic film at a position corresponding to the aperture can be bulged by a voltage application to act on the slit portion. Furthermore, the side of the spacer film on the waveguide housing sheet may be determined as the side to which an air gap is formed open in OFF state. Such an arrangement allows smooth and highly reliable ON/OFF operation using the artificial muscle actuator together with the driver and the driver assistant member. Therefore, a very small driving mechanism may be constituted by a very simple arrangement.

In the optical switch according to the first aspect, the driver assistant member may be an elastic sheet arranged at the surface of the waveguide including the slit portion.

By arranging the elastic sheet as described above, a compressive force in the direction along which restoring connection of the slit portion is performed is applied from the elastic sheet extended due to the air gap opened in OFF state onto the waveguide housing sheet, ensuring ON state to be realized. By setting the elastic modulus of the elastic sheet to be a value indicating a rather rigid elasticity, more reliable switching to the ON state may be achieved. Metal, an organic material, a glass material or the like may be used for the elastic body. Thus, a simple mechanism may be employed to achieve reliable switching from OFF state to ON state.

In the optical switch according to the first aspect, a convex protrusion protruded toward the slit portion may be attached at a position corresponding to the slit portion of the elastic sheet.

This arrangement allows a resilience stronger than that in the case without the convex protrusion to act on the slit portion. As a result, the reliability of switching from OFF state to ON state can be enhanced. Furthermore, the OFF state may take two positions such as (a) a position where a gap is opened at the protrusion side of the waveguide housing sheet and (b) a position where a gap is opened at the driver side of the waveguide housing sheet. This results in enhancement of the degree of freedom of the design for the OFF position.

In the optical switch according to the first aspect, the driver assistant member may be a spring applying stress onto the waveguide housing sheet.

Using such an arrangement, an optical switch with enhanced reliability of ON/OFF operation can be obtained by a very simple mechanism. Moreover, the OFF state may take two positions such as (a) a position where a gap is opened at the spring side of the waveguide housing sheet, and (b) a position where a gap is opened at the driver side of the waveguide housing sheet. As a result, the degree of freedom of the design for the OFF position can be enhanced. It is noted that the spring may be of any form, e.g. a form of a helical spring or a plate spring.

The optical switch according to the first aspect further includes a protrusion-attached substrate held between the waveguide housing sheet and the holding plate, on which a state-holding protrusion is arranged that maintains the state of protruding to the surface side or to the back side, at a position corresponding to the slit portion.

This arrangement allows the ON/OFF state to be held without the driver driving, after switching of ON/OFF is performed. Thus, lower power consumption can be realized.

In the optical switch according to the first aspect, the driver and the driver assistant member touch the waveguide housing sheet on one side of the slit portion, when viewed two-dimensionally, to push open the slit portion and to restore connection, so as not to deform the waveguide housing sheet on the other side.

This arrangement can prevent bending deformation at the waveguide through which light passes, for example, in the OFF state, generating no excessive loss associated with deformation of a waveguide. Thus, an optical switch with a low loss can be realized compared to the configuration in which light passes through a deforming waveguide.

In the optical switch according to the first aspect, an end of the holding plate holding the waveguide housing sheet may be chamfered at an opening portion of the holding plate.

This arrangement can alleviate the stress generated at a root portion when the driver is arranged on each of the upper and lower sides of the waveguide housing sheet to warp the waveguide housing sheet, and therefore fatigue of the waveguide housing sheet can be prevented.

According to the second aspect of the present invention, an optical switch is provided in an optical waveguide apparatus including waveguides through which light is propagated, a waveguide housing sheet containing the waveguides, and a support-holding plate supporting and holding the waveguide housing sheet. The optical switch includes a gap dividing and separating the waveguides and the waveguide housing sheet; and a driver arranged to interpose the support-holding plate and the gap, and moving toward the gap to hold the separated waveguide housing sheets on both sides of the gap between the driver and the support-holding plate to deform the sheets to connect the gap, and also moving backward from the connected gap to restore the gap.

This arrangement allows an optical switch to be formed, which performs highly reliable ON/OFF operation while the driving mechanism is reduced to half. It is noted that the gap width may preferably be a width allowing the gap to be connected in close contact by deformation within the range of elasticity of the waveguide housing sheet.

In the optical switch according to the second aspect, waveguides cross with one another inside of the waveguide housing sheet, and the gap may be arranged to diagonally traverse a crossing portion, when viewed two-dimensionally.

By this arrangement, the light propagated through the waveguide can continuously travel without its direction changed, when the gap is deformed to be connected at the crossing portion. On the other hand, when the gap is restored, the light can change its direction to travel along a crossing waveguide. As a result, a traveling direction can reliably be selected by operating the optical switch.

In the optical switch according to the second aspect of the present invention, an elastic sheet elastically deformable compared to the waveguide housing sheet is arranged between the waveguide housing sheet and the support-holding plate, and the gap may continuously be provided to the elastic sheet.

The arrangement allows the gap to be filled without application of extremely large force onto the waveguide sheet. This eliminates the possibility of causing plastic deformation onto the waveguide housing sheet, and hence a highly reliable optical switch performing reliable ON/OFF operation may be provided.

The optical waveguide apparatus of the present invention may include any one of the optical switches described above at a crossing portion where waveguides cross with one another.

By such an arrangement, an optical waveguide apparatus having an optical switch with enhanced reliability of the ON/OFF operation and with excellent durability can be obtained. In the optical waveguide apparatus, an optical switch provided at the crossing portion may be used to select the direction of light.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will now be described with reference to the drawings.

First Embodiment

Figure 1:
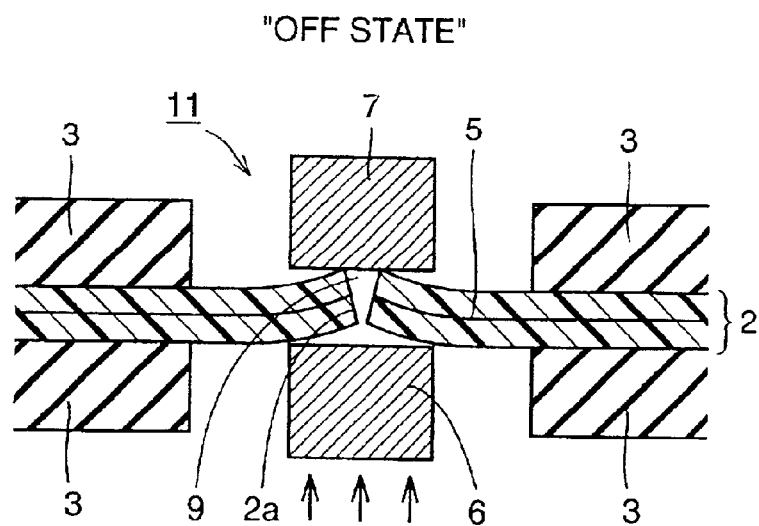
FIG. 1 is a section view of an optical switch according to the first embodiment of the present invention (OFF state)
Figure 2:
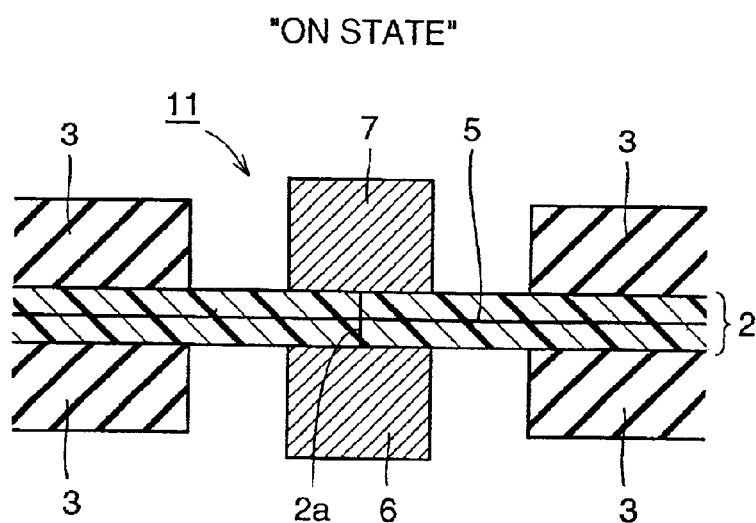
FIG. 2 is a section view of the optical switch according to the first embodiment of the present invention (ON state)

FIGS. 1 and 2 are section views each taken along the direction of a waveguide in a waveguide optical switch according to the first embodiment of the present invention. FIG. 1 shows an OFF state whereas FIG. 2 shows an ON state. A core 5, i.e. the waveguide, is enclosed in a film polymer 2, and film polymer 2 is flattened interposed between rigid holding plates 3. Light is trapped in the core 5 portion of film polymer 2, and is propagated therein with a part of the light exuding to the film polymer. A slit portion is arranged at a crossing portion 11 where cores of waveguides cross with one another, such that the slit diagonally traverse the waveguides. The optical switch is constituted by the slit portion and two push rods (driving members) 6,7 arranged so as to interpose the film polymer from upper and lower sides thereof.

In the OFF state shown in FIG. 1, a gap 9 is formed between end surfaces 2a of the film polymer. In this OFF state, the light propagated in one core and the film polymer cannot exit to the air, and totally reflects at one end surface 2a. Thus, the light cannot keep being propagated in the same travelling direction. On the other hand, in the ON state, end surfaces 2a of the film polymer are in contact with each other. Thus, the light propagated in one core and film polymer passes through the contact end surface portion maintaining the same traveling direction, and is propagated into the other core. In the description below, light propagated in the film polymer means that the light is propagated in a core in the film polymer, with a part thereof exuding to the film polymer. Furthermore, when described that the film polymer is in contact, it means that cores included in the film polymer are also in contact with each other.

To change the optical switch from the OFF state to the ON state, the push rods are operated as follows. First, push rod (a driver) 6 on the lower side pushing up the film polymer in the OFF state is lowered. This allows end surfaces 2a of the film polymer to be in contact with each other by the elastic resilience of the film polymer. However, lowering of lower push rod 6 alone would require a long time to completely bring end surfaces 2a to be in contact with each other, or would only achieve partial contact even after a long time.

In order to solve this problem, in the present embodiment, another push rod (a driver assistant member) 7 is arranged so as to hold the film polymer between push rods 6 and 7. Push rods 6 and 7 lightly hold the film polymer therebetween from the upper and lower sides to flatten the film polymer under loose constraint, and to guide the film polymer to a position at which end surfaces 2a are in contact and are pressed against each other.

To switch from the ON state to the OFF state, the operation opposite to that for switching from the OFF state to the ON state is performed. When the state shifts from ON to OFF, the contact end surfaces are pushed open to form gap 9. In this case, though one push rod 6 can smoothly realize the OFF state, two push rods may be used to further enhance the reliability.

In the present embodiment, by using two push rods 6, 7, the ON state can reliably be realized by bringing end surfaces 2a in contact with each other under loose constraint, and switching to the opposite OFF state can also be enhanced in its reliability. It is noted that, though the slit portion shown in FIGS. 1 and 2 is formed by completely cutting the film polymer, the present invention also encompasses a slit portion with a portion thereof left uncut. Such a non-slit portion may be left so as to be a reference at the time of restoring the connection of the slit portion. This can increase the reliability for restoration when the end surfaces of the cores, i.e. waveguides, are restored to be in contact with each other. Though only the slit portion in which the film polymer is completely cut is shown in the drawings illustrating the embodiments below, the slit portion similarly encompasses, in any of the embodiments, the slit portion partially having a non-slit portion.

Second Embodiment

In a waveguide optical switch according to the second embodiment of the present invention, a piezoelectric element, i.e. an element constituted by a piezoelectric material that induces distortion or stress by applying a voltage, is used for at least one of a driver (driving mechanism) or a driver assistant member. For the piezoelectric element, barium titanate ($BaTiO_3$), lead zirconate titanate ($PbZrO_3$, $PbTiO_3$), niobate ($NaNbO_3$, $KnbO_3$, $PbNb_2O_6$), rock crystal, Rochelle salt, $LiTaO_3$, $LiNbO_3$ and so forth may be used.

Using the piezoelectric element, a pressure power of hundreds of newtons can be obtained by a normal voltage application. Thus, a simple mechanical structure can realize alternate switching between the state where the end surfaces are in contact with each other (ON state) and the state where a gap is arranged between the end surfaces (OFF state).

Third embodiment

Figure 3:
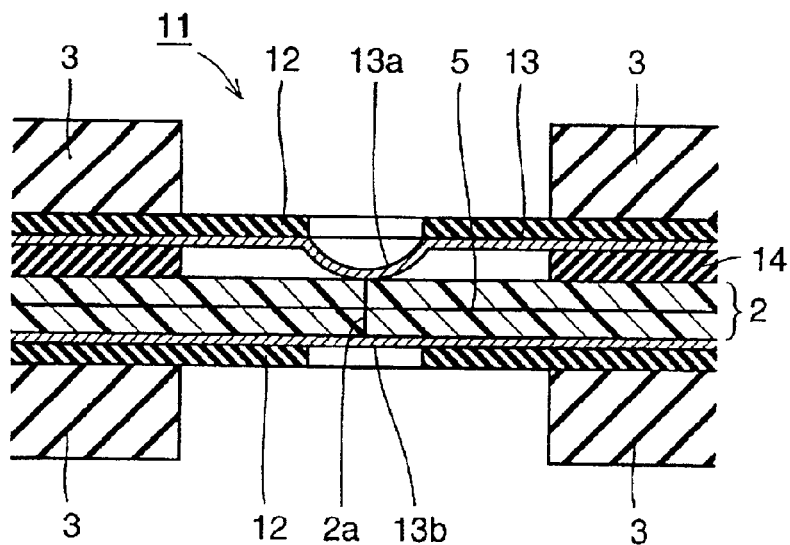
FIG. 3 is a section view of an optical switch according to the third embodiment of the present invention (ON state)
Figure 4:
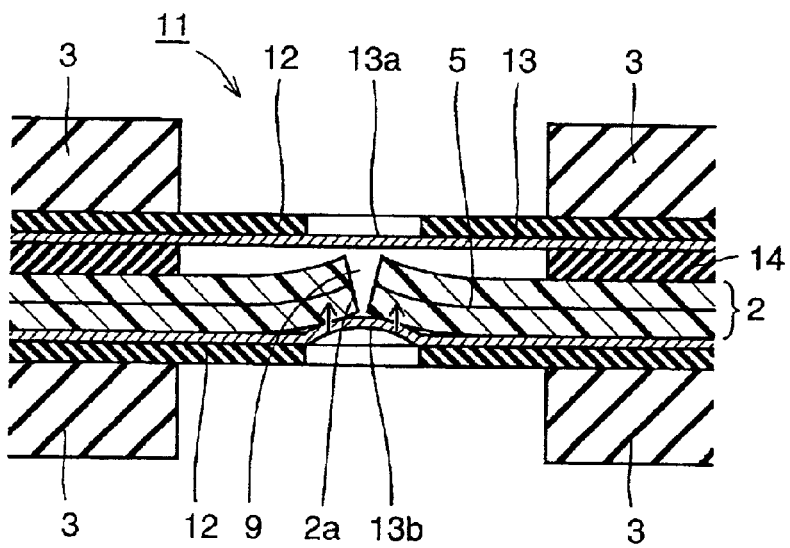
FIG. 4 is a section view of the optical switch according to the third embodiment of the present invention (OFF state)

FIGS. 3 and 4 are section views each taken along a waveguide and showing a waveguide optical switch according to the third embodiment of the present invention. FIG. 3 shows the ON state where end surfaces 2a are in contact with each other, whereas FIG. 4 shows the OFF state where gap 9 is formed between the end surfaces. In the present embodiment, artificial muscles are used for alternate switching between the contact state and the separate state of the end surfaces. That is, the artificial muscles arranged on both the upper and lower sides of the film polymer are used in place of two push rods 6, 7 used in the first embodiment.

As shown in FIGS. 3 and 4, an artificial muscle actuator includes, for example, a sheet-like apertured frame 12 and a sheet-like electrode-attached elastic body 13, and a spacer 14 is further arranged on the upper side of the film polymer. Electrode-attached elastic bodies 13a, 13b of electrode-attached elastic body 13, which are arranged at a portion of an aperture of apertured frame 12, move so as to alternately protrude toward the film polymer. The alternate movements of the artificial muscles correspond to the forward and backward movements of the driver with respect to the slit portion. In this case, there is no difference in the moving mechanism between the driver and the driver assistant member. They have the same mechanism and similarly perform forward and backward movements.

Figure 5:
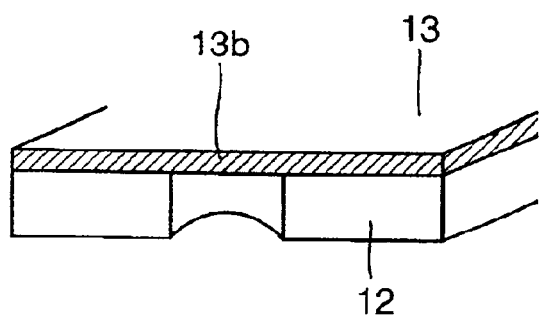
FIG. 5 is a perspective view showing an artificial muscle actuator used in the optical switch according to the third embodiment of the present invention (when the power is OFF)
Figure 6:
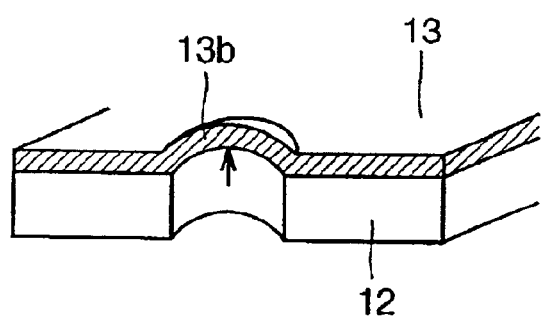
FIG. 6 is a perspective view showing an artificial muscle actuator used in the optical switch according to the third embodiment of the present invention (when the power is ON)

Referring to FIG. 5, when a voltage is OFF, electrode-attached elastic body 13 remains flat including the portion 13b facing the aperture. However, as shown in FIG. 6, when a voltage is applied, portion 13b facing the aperture bulges toward the opposite side of the aperture.

Thus, alternate switching of ON and OFF states may reliably be realized, as in the case with the driver according to the first embodiment, while portions 13a, 13b facing the aperture of the film polymer loosely constrain the end surfaces of the film polymer from the upper and lower sides.

The artificial muscle can be made smaller to be on the order of tens of µm in size of the section perpendicular to the deforming direction. Therefore, it can be used as a component of an optical switch with a fine waveguide structure.

Fourth Embodiment

Figure 7:
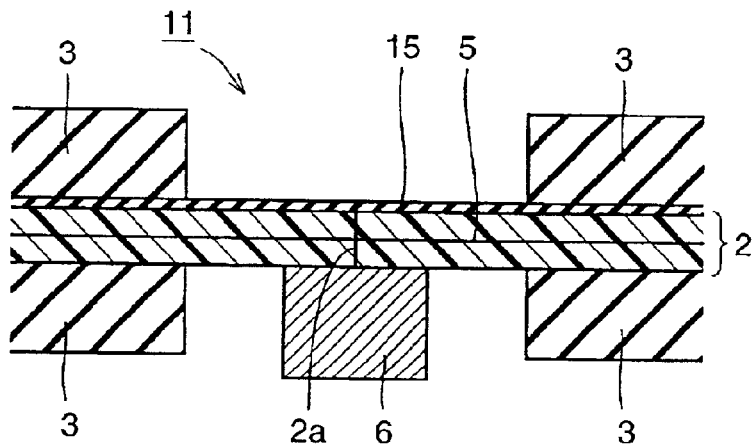
FIG. 7 is a section view of an optical switch according to the fourth embodiment of the present invention (ON state)
Figure 8:
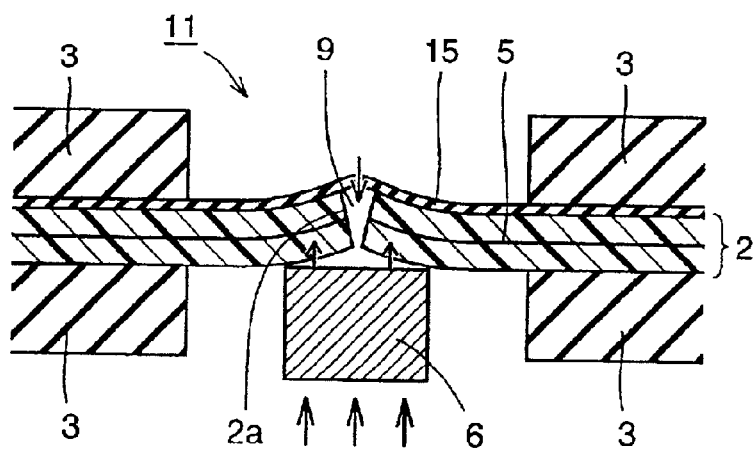
FIG. 8 is a section view of the optical switch according to the fourth embodiment of the present invention (OFF state)

An optical switch according to the present embodiment includes a driver 6 similar to those of the optical switches in the first to third embodiments, on one side, e.g. the lower side, of the film polymer (FIGS. 7 and 8). On the other side, e.g. the upper side, an elastic body 15 of the driver assistant member is arranged generating a repulsion force in accordance with the deformation. A sheet having appropriate thickness and elasticity as an elastic body is used and arranged, as shown in FIGS. 7 and 8, to be in contact with the upper surface of the film polymer.

In state where the end-surfaces are in contact with each other, elastic body 15 preferably has appropriate rigidity and thickness so as to hardly cause deformation even if driver 6 applies an upward force by which a reliable contact state can be attained. The elastic sheet has very little elastic deformation described above, so that it can be designed using almost any material such as metal, an organic material, glass, or the like. The use of such an elastic body will apply stronger constraint to the end portion of the film polymer compared to the case with the driver and driver assistant member in each of the first to the third embodiments, in shifting from the OFF state where a gap is formed between the end surfaces to the ON state where the end surfaces are in contact with each other.

The optical switch in the present embodiment has a mechanism that can be assembled very easily only by superposing the sheet-like elastic body on the film polymer. Thus, size reduction, lower cost and lower power consumption can be realized.

Fifth Embodiment

Figure 9:
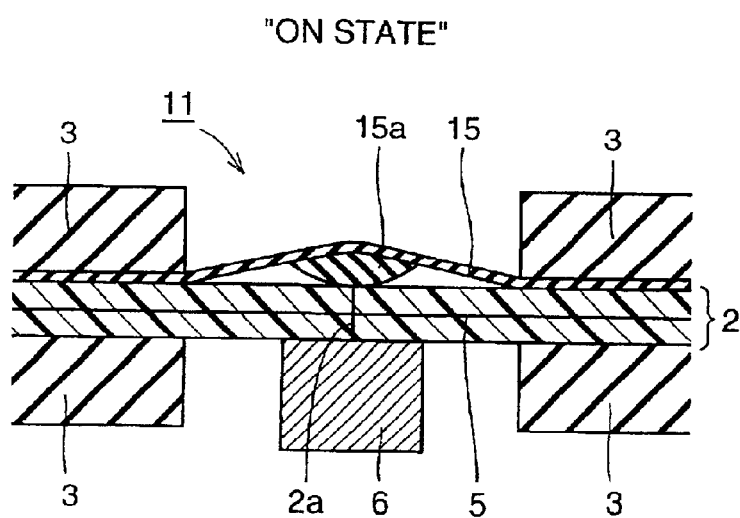
FIG. 9 is a section view of an optical switch according to the fifth embodiment of the present invention (ON state)
Figure 10:
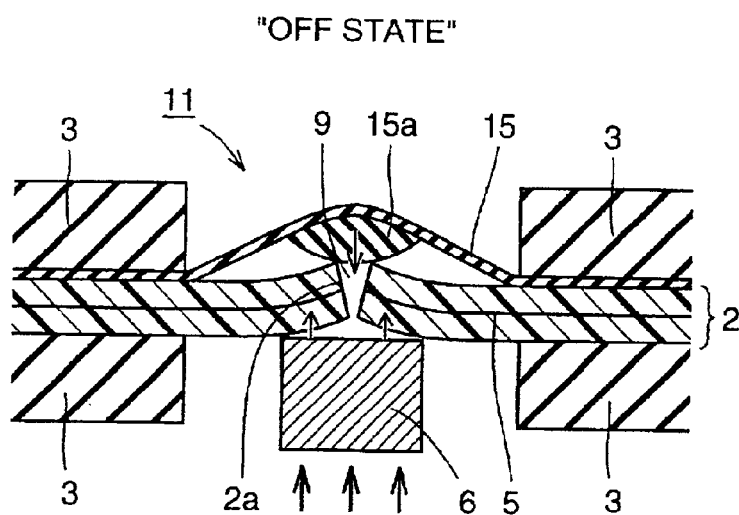
FIG. 10 is a section view of the optical switch according to the fifth embodiment of the present invention (OFF state)

In an optical switch according to the present embodiment, a protrusion 15a facing downward is provided on the sheet elastic body of the optical switch of the fourth embodiment (FIGS. 9 and 10). As shown in FIG. 9, in shifting from the OFF state to the ON state, comparatively strong constraint is applied to both end surfaces 2a from the upper and lower sides by an elastic body with protrusion 15a arranged underneath thereof and by driver 6, to realize the ON state. That is, the state shifts by applying an upper force to the end surface portion from driver 6 in addition to a downward force by elastic body 15 via protrusion 15a, to adjust the balance. As a result, alternate switching between contact state and gap-formed state of the end surfaces can more reliably be attained.

The OFF state can take two positions, such as (a) a position at which a gap is formed to spread open the upper side of contact end surfaces 2a by pushing up with the driver, and (b) a position at which a gap is formed to spread open the lower side of contact end surfaces 2a by pushing down with protrusion 15a.

Provision of the mechanism described above can realize reduction in size, cost and power consumption in a simple mechanism.

Sixth Embodiment

Figure 11:
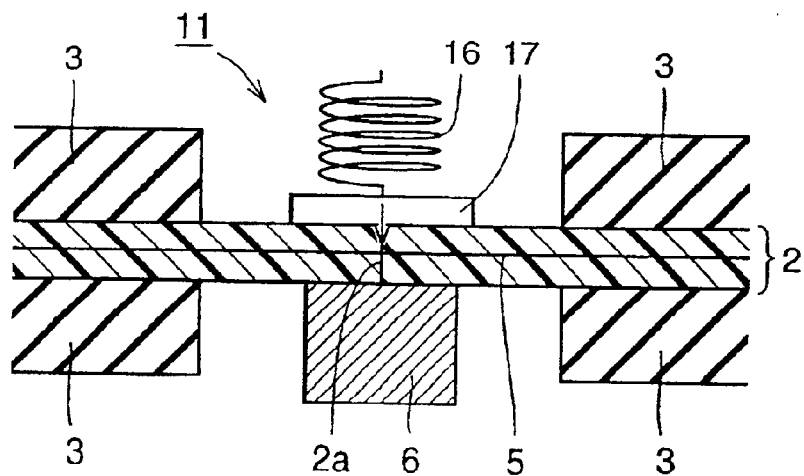
FIG. 11 is a section view of an optical switch according to the sixth embodiment of the present invention (ON state)
Figure 12:
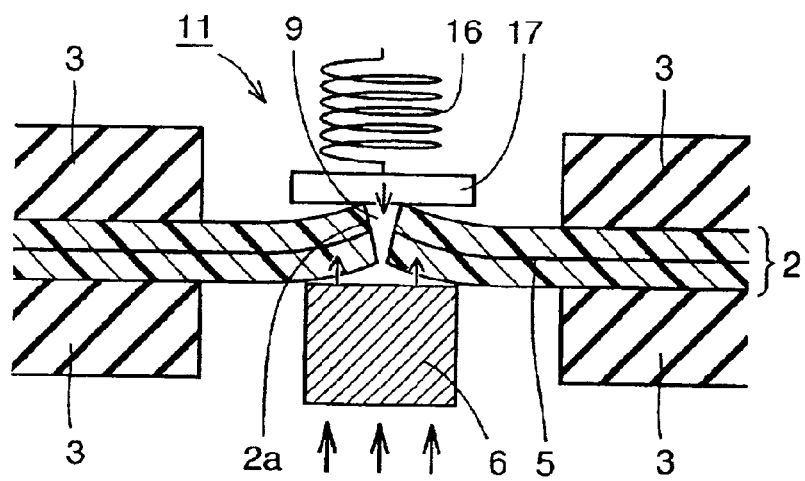
FIG. 12 is a section view of the optical switch according to the sixth embodiment of the present invention (OFF state)

The present embodiment is characterized in that a spring is used, as a driver assistant member, in place of a sheet of the elastic body in the fourth embodiment (FIGS. 11, 12). In this optical switch, a downward force is applied by a spring 16 in switching to the state where the end surfaces are in contact with each other. Then, an upward force corresponding to the downward force is also applied by driver 6 located on the lower side of the film polymer, to adjust the balance. As a result, a comparatively strong constraint force is applied to the end surfaces to reliably realize the state where the end surfaces are in contact with each other.

The OFF state can take two positions, such as (a) a position at which a gap is formed to spread open the upper side of the contact end surfaces 2a by pushing up with the driver, and (b) a position at which a gap is formed to spread open the lower side of the contact end surfaces 2b by pushing down with spring 16.

Figure 13:
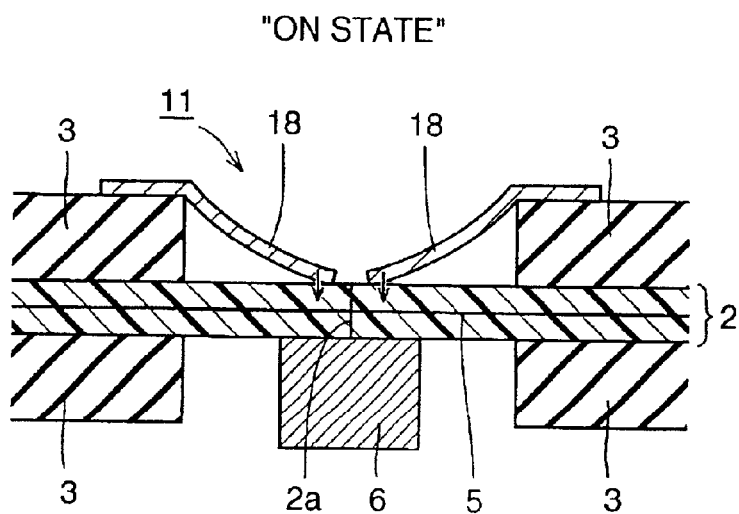
FIG. 13 is a section view of a modification of the optical switch according to the sixth embodiment of the present invention (ON state)
Figure 14:
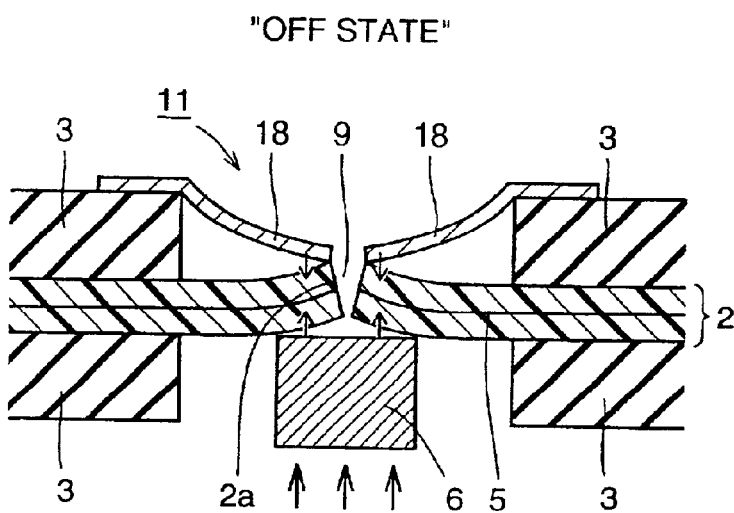
FIG. 14 is a section view of the modification of the optical switch according to the sixth embodiment of the present invention (OFF state)

It is noted that the spring may be a form of a helical spring as shown in FIGS. 11 and 12, or a plate spring as shown in FIGS. 13 and 14.

Use of the spring can realize reduction in size, cost and power consumption by a simple mechanism.

Seventh Embodiment

Figure 15:
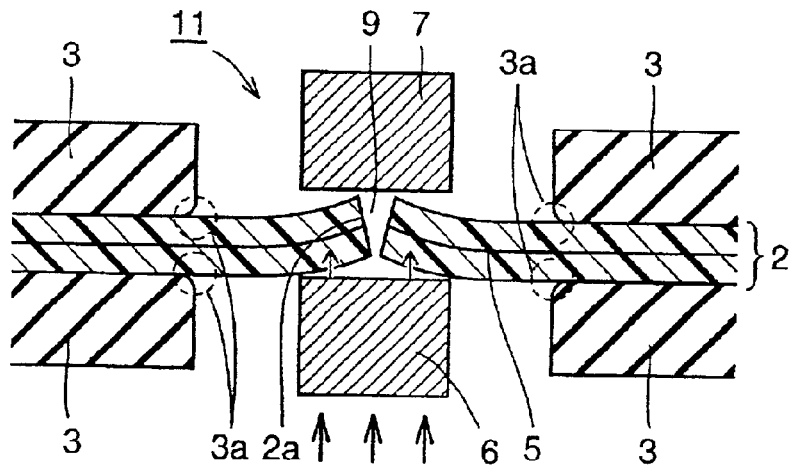
FIG. 15 is a section view of an optical switch according to the seventh embodiment of the present invention (OFF state)

According to the present embodiment, in the optical switches according to the first to sixth embodiments described above, holding plates 3 interposing film polymer 2 each has a chamfered portion 3a (FIG. 15). Chamfered portion 3a alleviate the intensive stress onto the film polymer. As a result, fatigue of the film polymer can be prevented, and therefore the reliability can be enhanced.

Eighth Embodiment

Figure 16:
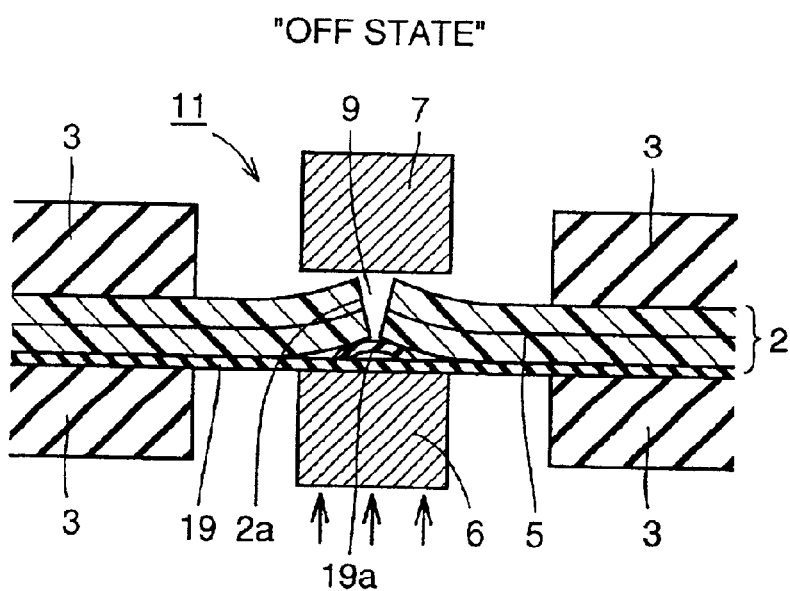
FIG. 16 is a section view of an optical switch according to the eighth embodiment of the present invention (OFF state)
Figure 17:
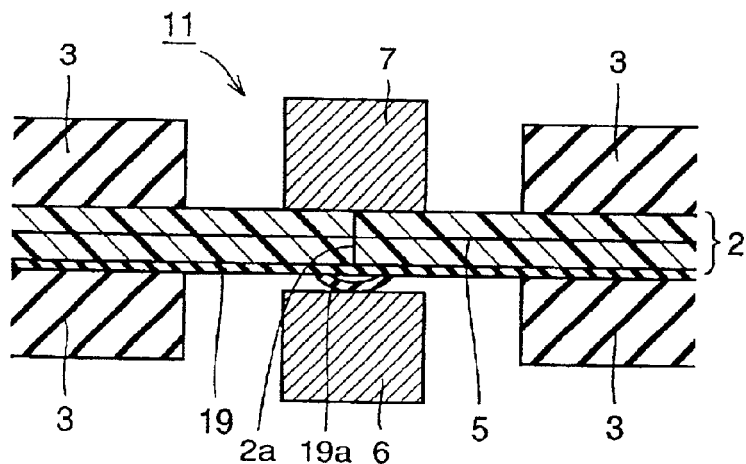
FIG. 17 is a section view of the optical switch according to the eighth embodiment of the present invention (ON state)
Figure 18:
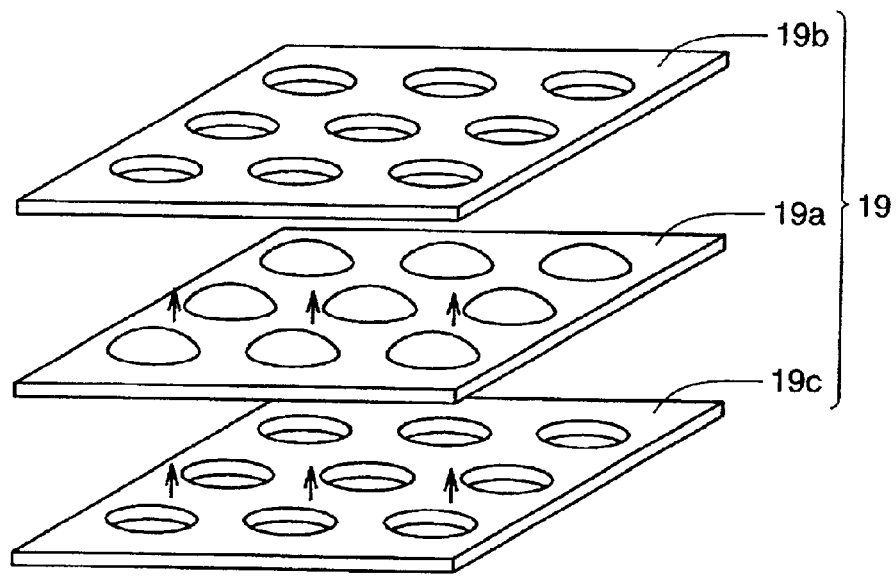
FIG. 18 is an exploded perspective view of a substrate used for the optical switch according to the eighth embodiment of the present invention, with a state-holding protrusion attached thereto.

According to the present embodiment, in the optical switches in the first to seventh embodiments, a protrusion-attached substrate 19 with a protrusion that maintains a state is arranged between film polymer 2 and holding plate 3 (FIGS. 16, 17). FIG. 18 is an exploded perspective view of protrusion-attached substrate 19. State-holding protrusions 19a are made of a rubber-like elastic member, and the portion on the periphery thereof is made of a rigid member. For example, as shown in FIG. 18, a preferable structure is such that a rubber elastic sheet having protrusions is held between rigid plates.

Film polymer 2, protrusion-attached substrate 19 and holding plates 3 are fixed such that a protrusion touches the slit portion at the crossing portion of waveguides. As shown in FIG. 16, when driver 6 on the lower side is displaced upward, the substrate portion of the protrusion-attached substrate remains unmoved due to its rigidity, and only rubber protrusion 19a maintaining the state is deformed upward to be convex. Here, driver assistant member 7 on the upper side is made contact with the film polymer with, at most, a force by which the rubber protrusion 19a is maintained to be convex upward. It is understood that driver assistant member 7 on the upper side may not apply any stress on the protrusion.

Once the upward convex is formed, the OFF state can be maintained by the upward protrusion without driver 6 being driven.

Furthermore, when driver assistant member 7 on the upper side is displaced downward, only the film polymer and rubber protrusion 19a are pushed down. The protrusion-attached substrate would remain unmoved due to its rigidity, so that rubber protrusion 19a is deformed to be convex downward, attaining the state where the end surfaces of the film polymer are in contact with each other. Then, driver 6 on the lower side may touch the protrusion with a force by which protrusion 19a in a downward convex state would not return to the upward convex state, or may not touch the protrusion at all.

The optical switch described above can reliably realize alternate switching of the ON state and the OFF state. Moreover, after switching to the ON state or the OFF state, the state can be maintained without a driver or driver assistant member being driven, and therefore reduction in power consumption can be realized.

Ninth Embodiment

In the optical switches in the first to eighth embodiments, the driver and the driver assistant member were arranged at a position such that the end surfaces of the both waveguides are moved to be in contact with each other. However, in the optical switch according to the present embodiment, the driver and the driver assistant member are arranged at a position such that only the end of one waveguide side is displaced, not displacing the end of the other waveguide side (FIGS. 19, 20).

Figure 19:
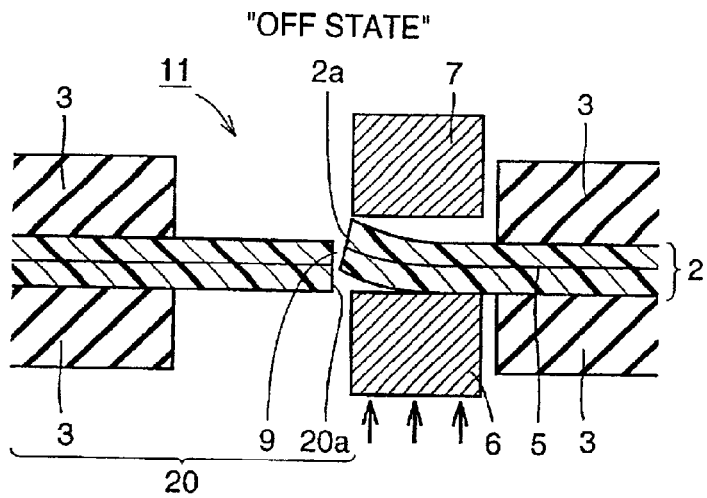
FIG. 19 is a section view of an optical switch according to the ninth embodiment of the present invention (OFF state)
Figure 20:
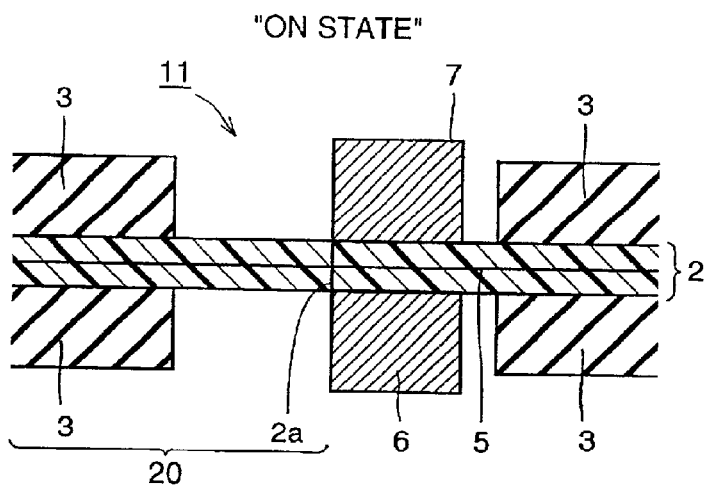
FIG. 20 is a section view of the optical switch according to the ninth embodiment of the present invention (ON state)
Figure 21:
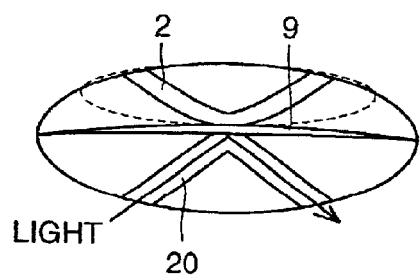
FIG. 21 is a schematic plan view showing that light is propagated in a non-deformed waveguide, in the OFF state of the optical switch according to the ninth embodiment of the present invention.

In FIGS. 19 and 20, driver 6 and driver assistant member 7 touch one waveguide 2 and deforms the waveguide 2, to realize the OFF state and the ON state. No action is performed onto waveguide 20 by the driver, so that waveguide 20 is maintained to be in a horizontal state all the way to the portion of an end surface 20a. Referring to FIG. 21, the waveguide 2 side is bent upward, and gap 9 is generated between waveguide 2 and waveguide 20 which is subjected to no bending deformation.

Light passes through waveguide 20 subjected to no bending, and travels in a predetermined waveguide after total reflection at the gap. Thus, no excessive loss due to the waveguide bending will be generated by the light. Therefore, compared to the optical switches in the first to eighth embodiments, a low-loss switch can be realized.

Tenth Embodiment

Figure 22:
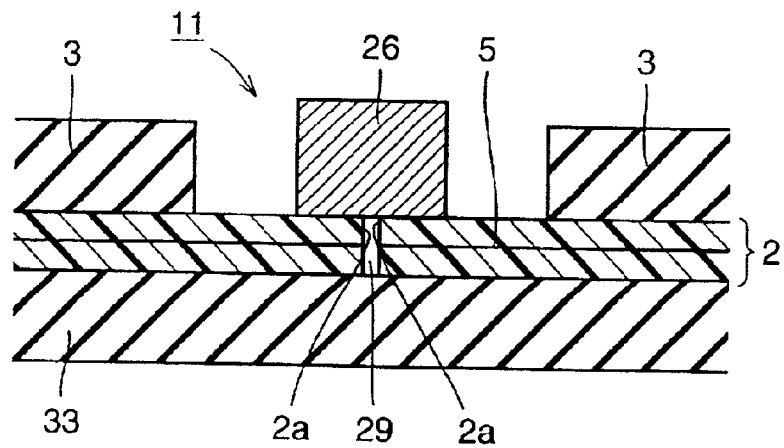
FIG. 22 is a section view of an optical switch according to the tenth embodiment of the present invention (OFF state)
Figure 23:
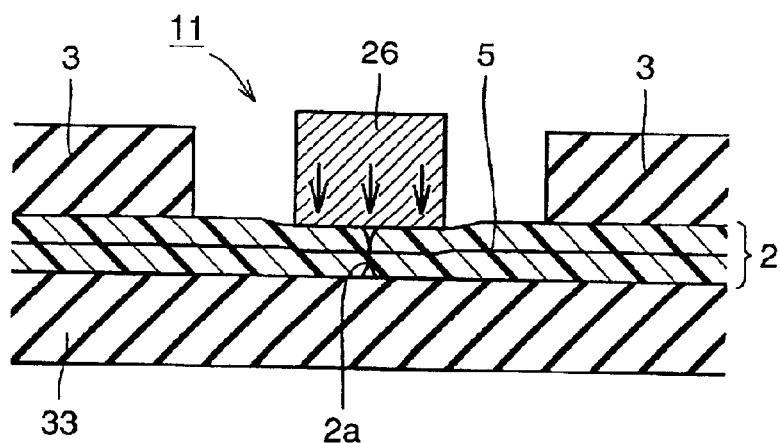
FIG. 23 is a section view of the optical switch according to the tenth embodiment of the present invention (ON state)

In the optical switch according to the present embodiment, at a waveguide crossing portion, a gap of approximately 1 μm is formed and fixed between opposing waveguide end surfaces. As shown in FIGS. 22 and 23, film polymer 2 is placed on a hard supporting substrate 33, and a driver 26 is arranged thereon. Referring to FIG. 22, in a state where no pressure is applied onto the film polymer by the driver, light is totally reflected at the gap between the waveguides. Referring to FIG. 23, in a state where a pressure is applied onto the film polymer by driver 26, the film deforms so as to extend along the surface contacting with substrate 33 due to the elasticity of the film polymer. The extending deformation allows the waveguide end surfaces to be in contact with each other, realizing the ON state, and thus light passes through the contact end surface portion.

According to the optical switch in the present embodiment, the number of drivers can be reduced to half, compared to the first embodiment. Thus, reduction in size, cost, and consumption power can be realized.

Eleventh Embodiment

According to the eleventh embodiment of the present invention, the distance between opposing slit end surfaces is set to be at most the distance by which the film polymer is displaced in the direction of the optical axis when pushed with a force by which the film polymer starts plastic deformation. If the distance between the opposing slit end surfaces of waveguides is too large, a large force is required to cause the deformation to make the end surfaces to be in contact with each other. However, application of excessively large force would cause plastic deformation of the film polymer.

By setting the distance between the slit end surfaces as described above, plastic deformation of the film polymer can be prevented, and therefore an optical switch with excellent durability and high reliability can be provided.

Twelfth Embodiment

Figure 24:
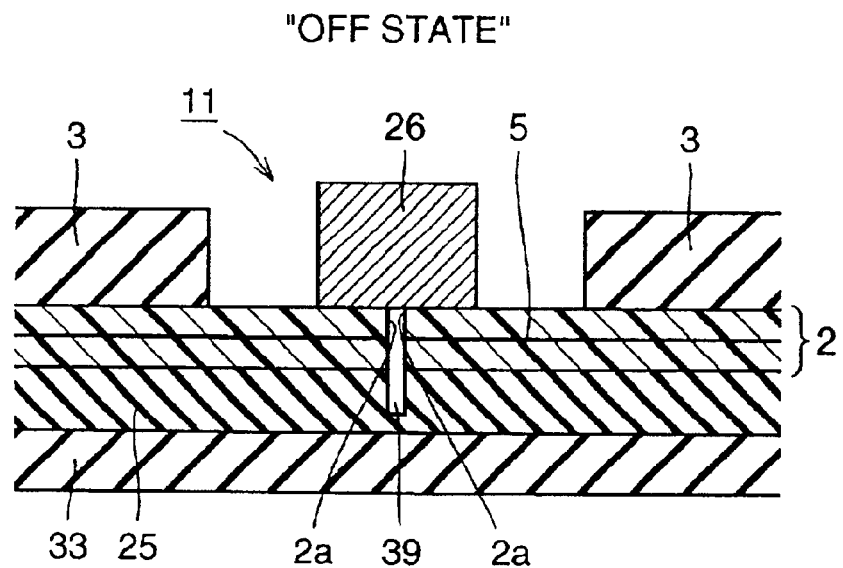
FIG. 24 is a section view of an optical switch according to the twelfth embodiment of the present invention (OFF state)
Figure 25:
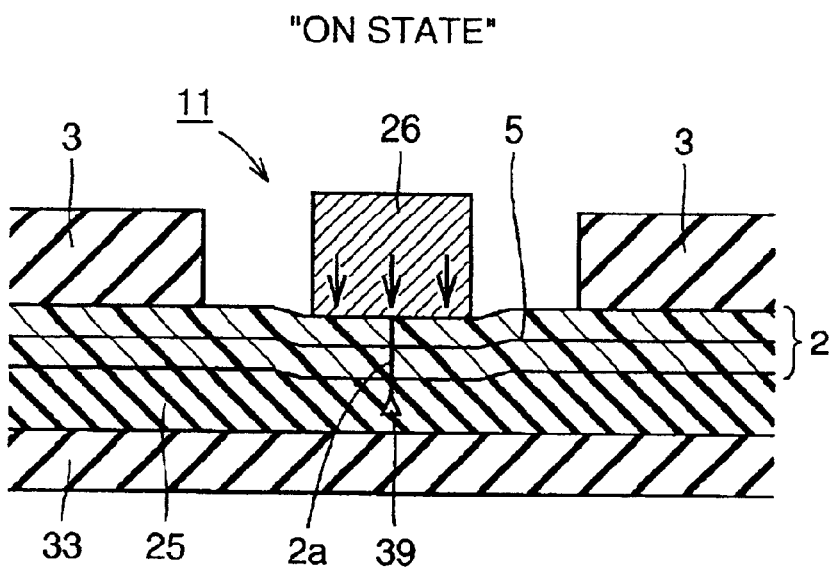
FIG. 25 is a section view of the optical switch according to the twelfth embodiment of the present invention (ON state)
Figure 26:
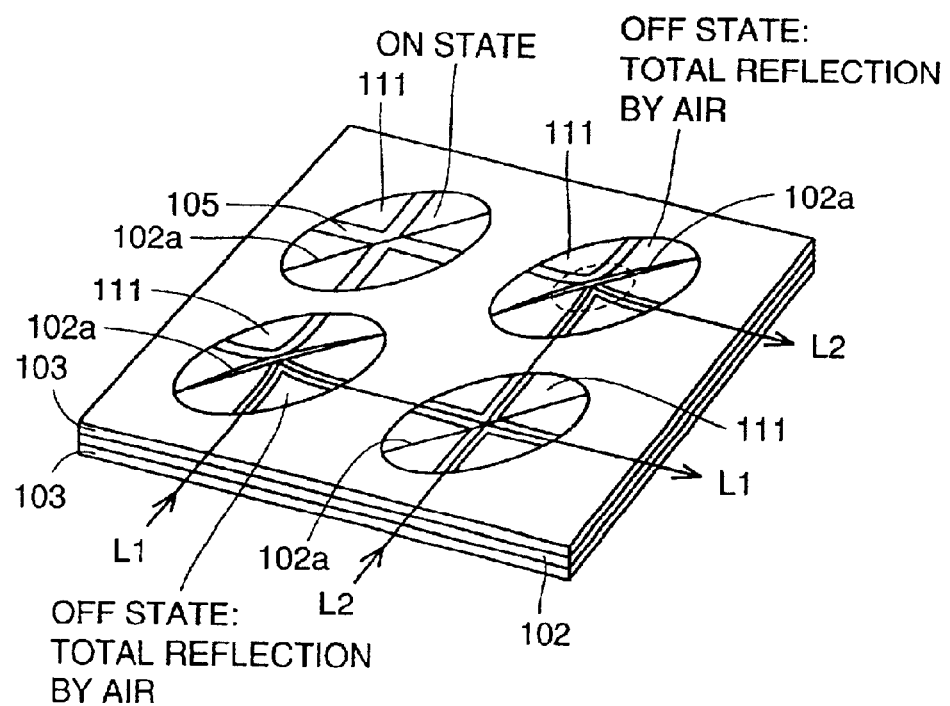
FIG. 26 is a perspective view showing an optical waveguide apparatus including a conventional optical switch.
Figure 27:
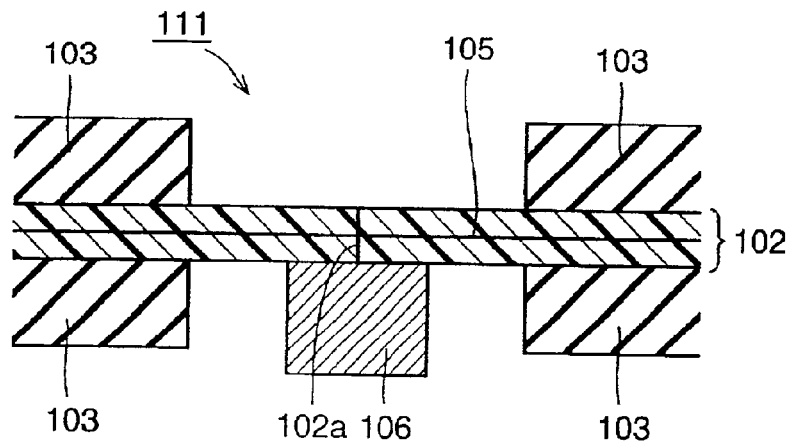
FIG. 27 is a section view of the optical switch included in the conventional optical waveguide apparatus in FIG. 26 (ON state)
Figure 28:
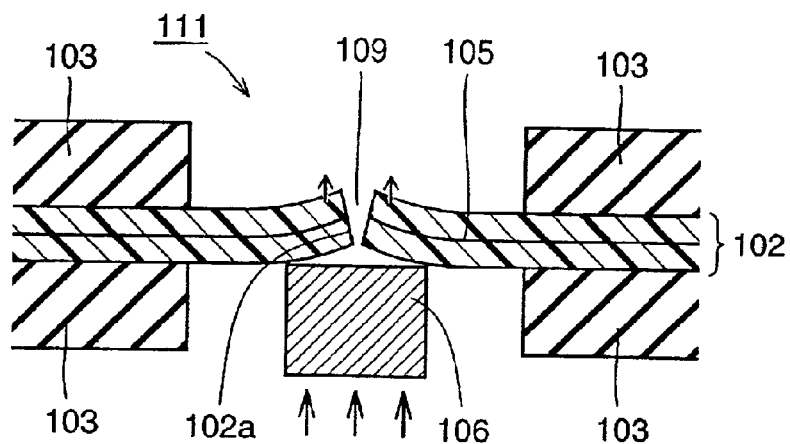
FIG. 28 is a section view of the optical switch included in the conventional optical waveguide apparatus in FIG. 26 (OFF state).

According to the present embodiment, in addition to the structure of the optical switches of the tenth and eleventh embodiments, an elastic sheet 25 that is easier to cause elastic deformation compared to the film polymer is affixed underneath the film polymer (FIGS. 24, 25). In forming cut surfaces of the waveguide, a part of elastic sheet 25 is also cut together therewith. A part of elastic sheet 25, however, is left uncut as a non-slit portion, as shown in FIG. 24.

By employing the structure described above, when a pressure is applied to the film polymer by driver 26, first, elastic sheet 25 under the film polymer, which is more likely to elastically deform compared to the film polymer, is deformed. Subsequently, the film polymer is thereby also deformed so that the cut surfaces are brought into contact with each other. The elastic sheet described above may be soft having an elastic coefficient smaller than that of the film polymer, or may be thick so as to easily be elastically deformed with an elastic coefficient approximately the same as that of the film polymer.

According to the optical switch having the configuration described above, a force smaller than that used in the tenth embodiment may be applied to bring the cut surfaces of the waveguide crossing portion into contact. As a result, the load applied to the film polymer can be reduced, and therefore an optical switch with excellent durability and high reliability can be provided. Furthermore, the optical switch is activated by a small stress, so that low power consumption can be realized.

Thirteenth Embodiment

According to the thirteenth embodiment of the present invention, in the twelfth embodiment, the distance of the gap at the crossing portion of opposing waveguides is made small so as to secure repetitive durability. The distance is set to be at most a distance for which the film polymer is displaced along the direction of the optical axis when the driver pushes the soft and elastic sheet 25 having the film polymer attached thereto with a force by which the sheet starts its plastic deformation. If the distance of the gap at the crossing portion is excessively large, a large force is required to push the sheet in order to cause deformation to bring the gap at the crossing portion in contact. However, application of excessively large force would cause plastic deformation of the film polymer and elastic sheet 25 described above.

By providing a limit for the width of the gap as described above, an optical switch having excellent durability and high reliability can be provided.

Although the preferred embodiments of the present invention has been described, the embodiments disclosed is by way of illustration and example only and is not to be taken by way of limitation. For example, the invention is intended to encompass the matters below.

(a) The driver is not limited to the ones described in the embodiments, such as the push rod, piezoelectric element, artificial muscle, elastic sheet, and protrusion-attached substrate. Any mechanism may be employed that can act from both sides of the slit portion to form a gap at the slit portion and to restore connection of the slit portion.

(b) As for the slit of the slit portion, the waveguide housing sheet including waveguides may be completely cut, or a portion thereof may be left uncut.

(c) The structure in which the opening portion of the holding plate is chamfered may also be applied to the portion on the side moved by raising and lowering one side of the slit portion to perform ON/OFF operation.

(d) The waveguide housing sheet is not limited to the film polymer, and may be a composite material including the film polymer, or a material in which ceramic fiber or glass fiber is woven.

The scope of the present invention is limited only by the appended claims, and encompasses all modifications fall within the meaning and scope of the description of the claims and equivalents.

What is claimed is:

1. An optical switch provided in an optical waveguide apparatus including waveguides through which light is propagated and a waveguide housing sheet enclosing the waveguides, comprising:

a slit portion slitting so as to traverse said waveauide housing sheet including said waveguides;

a driver performing driving action onto said slit portion; and a driver assistant member located so as to interpose said slit portion between said driver assistant member and said driver to assist said driver, said driver and said driver assistant member pushing open said slit portion to provide a gap between said waveguides, and bringing said slit portion in contact to connect said waveguides, wherein both said driver and said driver assistant member are configured to be put in motion to chance distances between a center plane of said waveguides and themselves.

2. The optical switch according to claim 1, wherein said slit portion is slit from one side of said waveguide housing sheet, without the slit reaching the other side of said waveguide housing sheet.

3. The optical switch according to claim 1, wherein said waveguides cross with one another within said waveguide housing sheet, and said slit portion is arranged to diagonally traverse said crossing portion when viewed two-dimensionally.

4. The optical switch according to claim 1, wherein said driver moves forward to and backward from said slit portion, said driver assistant member cooperates with the movement of said driver to act on said slit portion, and said driver and said driver assistant member push open said slit portion and restore connection of said slit portion.

5. The optical switch according to claim 4, wherein at least one of said driver and said driver assistant member includes a member capable of moving forward and backward along a direction approximately perpendicular to said waveguide housing sheet.

6. The optical switch according to claim 1, wherein said waveguide housing sheet is held by holding plates holding and supporting the waveguide sheet, each of the holding plates having an aperture at a position corresponding to said slit portion.

7. The optical switch according to claim 6, further comprising a protrusion-attached substrate held between said waveguide housing sheet and said holding plate and having a state-holding protrusion arranged at a position corresponding to said slit portion to maintain one of a state of protruding toward a surface side and a state of protruding toward a back side.

8. The optical switch according to claim 6, wherein an end of each of said holding plates holding said waveguide housing sheet is chamfered at an apertured portion of the holding plate.

9. The optical switch according to claim 1, wherein at least one of said driver and said driver assistant member is constituted by a piezoelectric element mechanically deformed in response to a voltage application.

10. The optical switch according to claim 1, wherein at least one of said driver and said driver assistant member is constituted by an artificial muscle actuator.

11. The optical switch according to claim 10, wherein said artificial actuator includes an apertured frame having an aperture at a position corresponding to said slit portion when viewed two-dimensionally, and an electrode-attached elastic film arranged between the apertured frame and said waveguide housing sheet, said artificial muscle actuator is provided at an upper side and a lower side of said waveguide housing sheet so as to interpose said waveguide housing sheet between both sides of the artificial muscle actuators, and one of the artificial actuators on either one of the upper and lower sides includes, between the artificial actuator and said waveguide housing sheet, an apertured spacer film having an aperture at a same region as said aperture.

12. The optical switch according to claim 1, wherein said driver assistant member is an elastic sheet arranged at a surface of said waveguide housing sheet including said slit portion.

13. The optical switch according to claim 12, wherein a convex protrusion protruding toward said slit portion is attached at a position corresponding to said slit portion of said elastic sheet.

14. The optical switch according to claim 1, wherein said driver assistant member is a spring applying a stress onto said waveguide housing sheet.

15. The optical switch according to claim 1, wherein said driver and driver assistant member touch a portion of said waveguide housing sheet arranged at one side of said slit portion when viewed two-dimensionally, to push open said slit portion and to restore connection of said slit portion, with another portion of said waveguide housing sheet at the other side of said slit portion kept non-deformed.

16. An optical waveguide apparatus, comprising the optical switch according to claim 1 at a crossing portion where said waveguides cross with one another.

17. An optical switch provided in an optical waveguide apparatus including waveguides through which light is propagated and a waveguide housing sheet enclosing the waveguides, comprising:

a slit portion in said waveguide housing sheet and traversing said waveguides;

a driver; and a driver assistant member, said slit portion disposed between said driver assistant member and said driver, wherein in a first position, one of said driver and said driver assistant member pushes open said slit portion to provide a gap between said waveguides, and in a second position, the other of said driver and said driver assistant member pushes closed said slit portion to connect said waveguides.

* * * * *